US012594587B2

(12) United States Patent
Silva et al.

(10) Patent No.: US 12,594,587 B2
(45) Date of Patent: Apr. 7, 2026

(54) CARRIER SYSTEM AND METHOD FOR LASER CLEANING ADHESIVE FASTENERS HAVING AXIAL COMPONENTS

(71) Applicant: Adapt Laser Systems, LLC, Kansas City, MO (US)

(72) Inventors: Steven L Silva, Leawood, KS (US); Tyler J O'Neill, Raytown, MO (US); Reid M Hulshof, Leawood, KS (US)

(73) Assignee: Adapt Laser Systems LLC, Kansas City, MO (US)

(*) Notice: Subject to any disclaimer, the term of this patent is extended or adjusted under 35 U.S.C. 154(b) by 97 days.

(21) Appl. No.: 18/593,622

(22) Filed: Mar. 1, 2024

(65) Prior Publication Data

US 2024/0293851 A1 Sep. 5, 2024

Related U.S. Application Data

(60) Provisional application No. 63/449,152, filed on Mar. 1, 2023.

(51) Int. Cl.
*B08B 7/00* (2006.01)
*B08B 13/00* (2006.01)

(52) U.S. Cl.
CPC ............ *B08B 7/0042* (2013.01); *B08B 13/00* (2013.01)

(58) Field of Classification Search
CPC .............................. B08B 7/0042; B08B 13/00
See application file for complete search history.

(56) References Cited

U.S. PATENT DOCUMENTS

2006/0119376 A1* 6/2006 Tunaboylu ......... G01R 1/06738 219/121.69
2011/0290276 A1* 12/2011 Cha ...................... B23K 26/352 134/1
2020/0011238 A1* 1/2020 Hales ........................ F02K 3/06

FOREIGN PATENT DOCUMENTS

WO WO-2021187642 A1 * 9/2021 ........... B08B 7/0042

OTHER PUBLICATIONS

Machine translation of WO-2021187642-A1 (Year: 2021).*

* cited by examiner

*Primary Examiner* — Erin F Bergner
(74) *Attorney, Agent, or Firm* — AVEK IP, LLC

(57) ABSTRACT

A laser ablation system including a multi-angle support structure in the form of a carrier which positions multiple nut plates in an axial position along the same incident angle of the laser beam path. Aligning the axis of the nut plate along the radius of the delivered laser beam path minimizes the need for part manipulation during the laser ablation process to achieve similar cleaning results.

7 Claims, 15 Drawing Sheets

CARRIER SYSTEM AND METHOD FOR LASER CLEANING ADHESIVE FASTENERS HAVING AXIAL COMPONENTS

CROSS-REFERENCE TO RELATED APPLICATION

This application claims priority in U.S. Provisional Patent Application No. 63/449,152 Filed Mar. 1, 2023, which is incorporated herein by reference.

BACKGROUND OF THE INVENTION

1. Field of the Invention

The present invention relates generally to laser cleaning of adhesive fasteners and method for use thereof, and more specifically to a fixture and process for laser cleaning adhesive fasteners which have an axial protrusion which is prone to shadowing in traditional laser cleaning methods.

2. Description of the Related Art

Existing methods for laser cleaning adhesive fasteners with axial protrusions rely on additional automation or part manipulation to get treatment of the flange top surface without shadowing or minimal shadowing. The existing processes add complexity in the design by implementing automation, linear axis or additional manipulation of the part to get satisfactory cleaning results.

Laser ablation has been implemented in the cleaning of adhesive fasteners, bushings, nut plates, standoffs and sleeves, such as the two-lug bracket-retained nut plate produced by Click Bond, Inc. of Carson City, NV. Current technology commonly uses 2D or 3D scanning optics with F-theta focus lenses to clean the surfaces but requires the use of linear stages, rotational stages or even manually manipulating the part to achieve cleaning to minimize shadowing created by the axial protrusions of the parts. 2D and 3D laser etching and cleaning systems are common and typically use a planner surface for part treatment. If parts with axial protrusions are processed, there is a need for part manipulation during the laser ablation process to achieve sufficient cleaning What is needed is a fixture and method for cleaning multiple nut plates and similar adhesive fasteners by tilting the axial protrusions along the radius or angle of incidence of the laser path. Such design eliminates the need for additional automation or human intervention to rotate the part to clean both sides without shadowing.

Heretofore there has not been available a system or method for cleaning around the axial protrusion without automation or human intervention with the advantages and features of the present invention.

BRIEF SUMMARY OF THE INVENTION

The present invention generally provides a laser ablation system including a multi-angle support structure in the form of a carrier which positions multiple nut plates in an axial position along the same incident angle of the laser beam path. Aligning the axis of the axial protrusion so that the delivered laser beam path is normal to the nut plate surface minimizes the need for part manipulation during the laser ablation process to achieve similar cleaning results.

The carrier has multiple mounting surfaces such that each position centers on incident angles near zero relative to the laser beam emission Each mounting surface may also be mounted at varying heights relative to the source or lens to optimize the focal distance for the most efficient ablation process.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, “inwardly” and “outwardly” refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. First Embodiment Laser Ablation System 2

As shown in FIGS. 1-5, the present invention is laser ablation system 2 including a carrier 4 for placing nut plates 152, 162 onto for laser ablation and cleaning. The carrier 4 design includes a multi angle support structure which positions multiple nut plates in an axial position along the same incident angle of the laser beam path. Aligning the axis of the nut plate in such a way that the laser beam path is nominal to the nut plate surface minimizes the need for part manipulation during the laser ablation process to achieve similar cleaning results.

Figure 9:
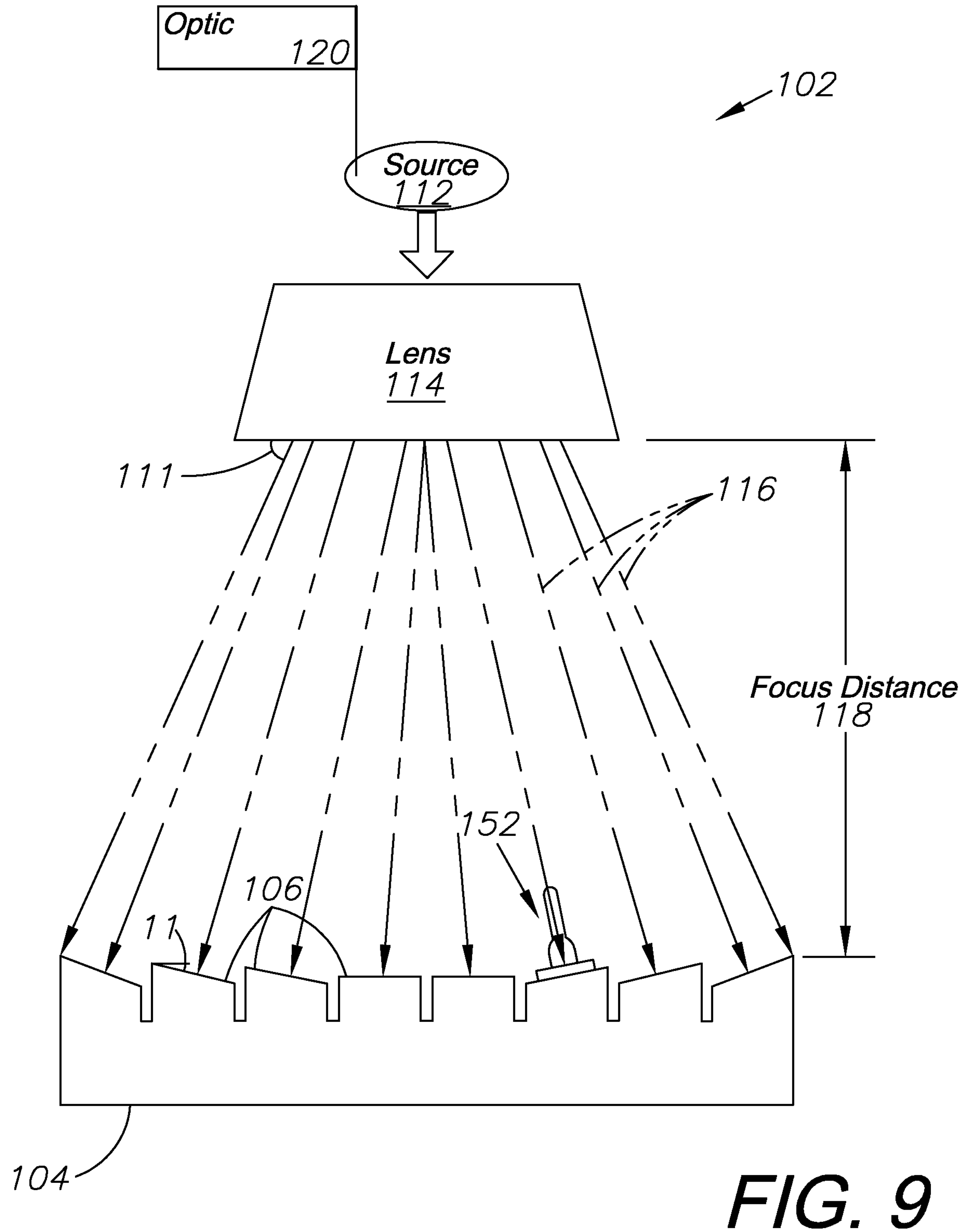
FIG. 9 is a top plan diagram diagrammatically demonstrating the working theory of the present invention.

Mounting surfaces 6 are arranged along the carrier 4 to receive multiple nut plates for cleaning. Another key element is that the top surface of the nut plate should be within the depth of field of the laser's focus to achieve sufficient ablation. FIG. 9. shows this in relation to an alternative embodiment system 102 with a slightly alternative embodiment carrier 104.

Figure 1:
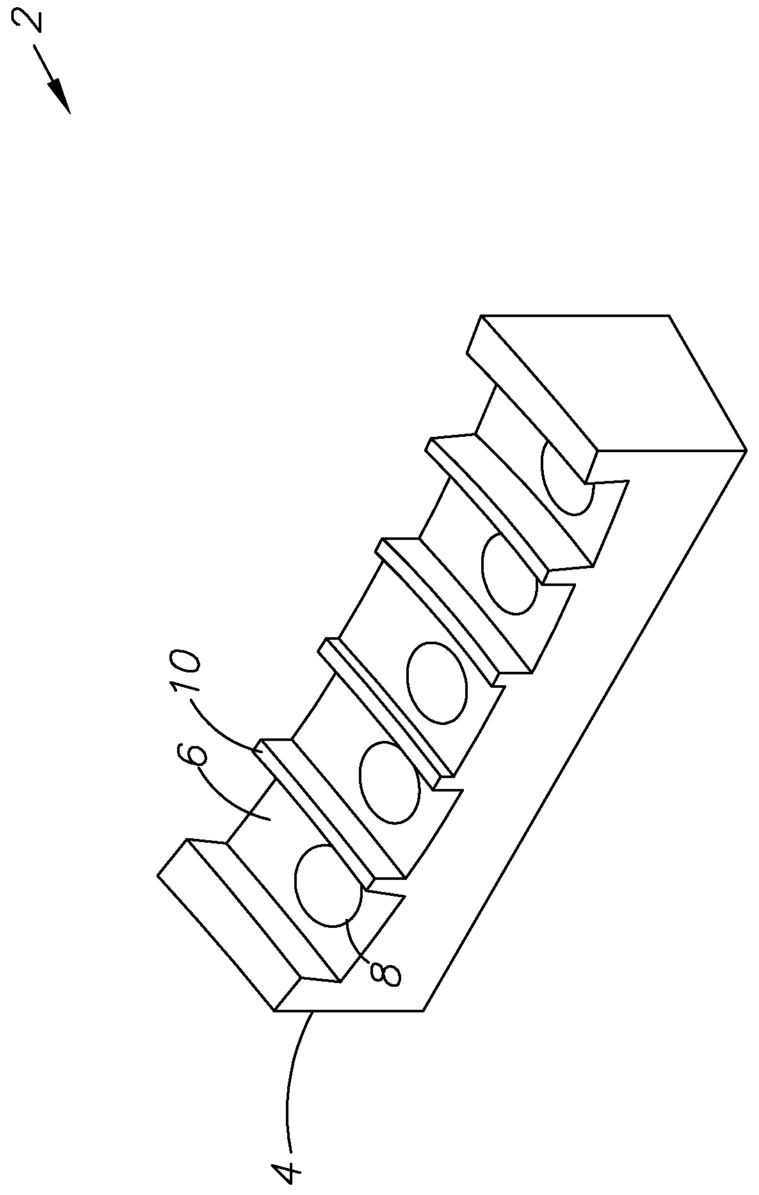
FIG. 1 is a three-dimensional isometric view of a first embodiment of the present invention.
Figure 2:
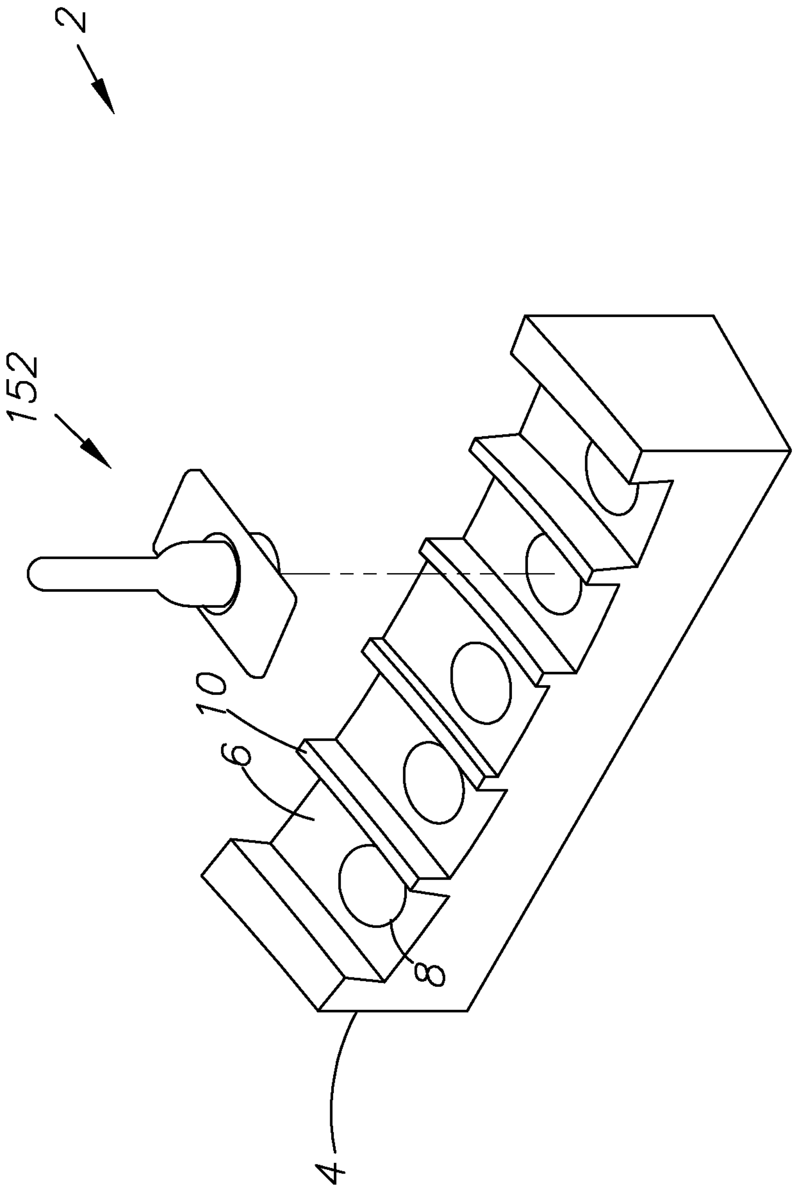
FIG. 2 is another three-dimensional isometric view thereof, shown interfacing with a nut plate element of the present invention.
Figure 5:
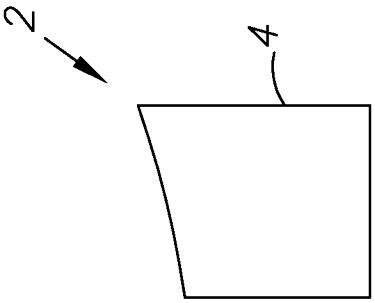
FIG. 5 is a right-side elevational view thereof.
Figure 3:
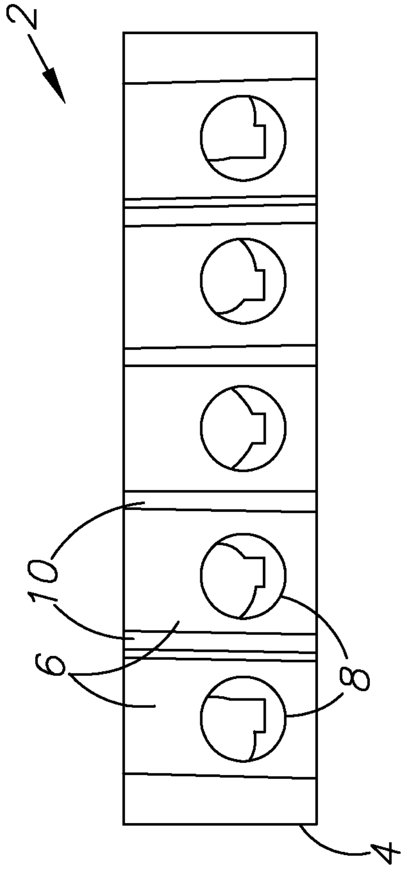
FIG. 3 is a top plan view thereof.
Figure 4:
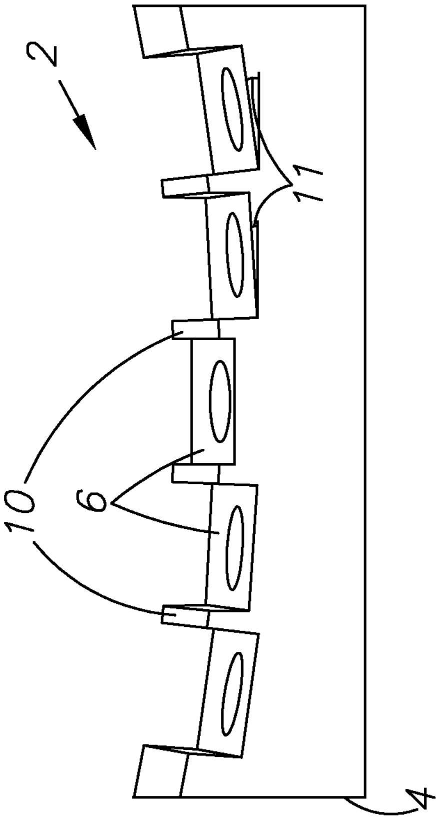
FIG. 4 is a front elevational view thereof.
Figure 10:
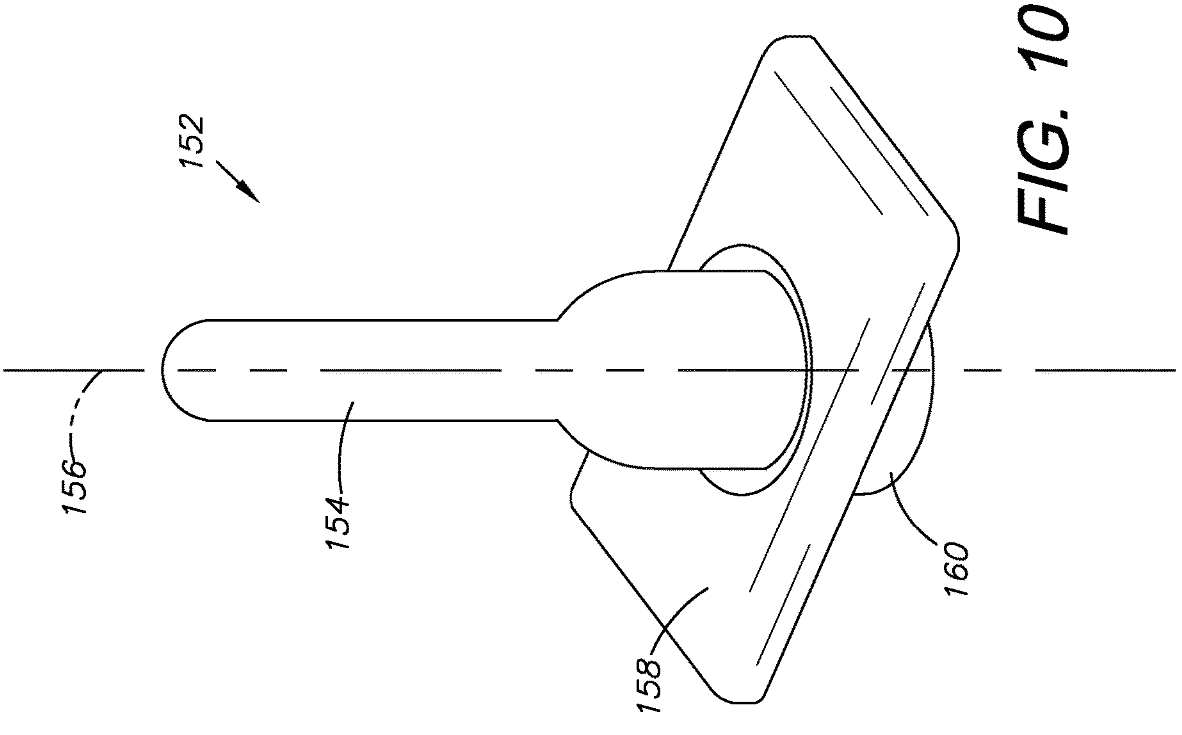
FIG. 10 is a three-dimensional isometric view of a nut plate element to be used in conjunction with the present invention.

The mounting surfaces 6 may be separated by barriers 10, and may be at varying heights as shown. This helps to ensure the mounted nut plates are an appropriate distance away from the laser source across the majority of the nut plate exterior surface. A mounting hole 8 may also be used to further secure the nut plate, such as via a base 160 as shown in FIG. 2 referencing FIG. 10.

III. Alternative Embodiment Laser Ablation System 52

Figure 6:
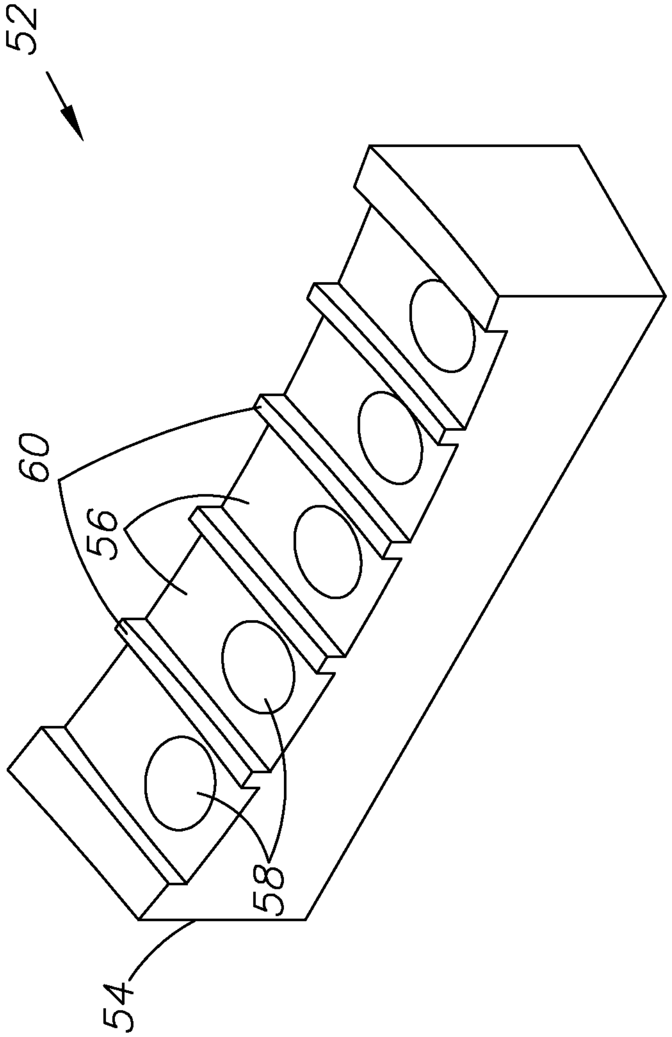
FIG. 6 is a three-dimensional isometric view of a second embodiment of the present invention.
Figure 8:
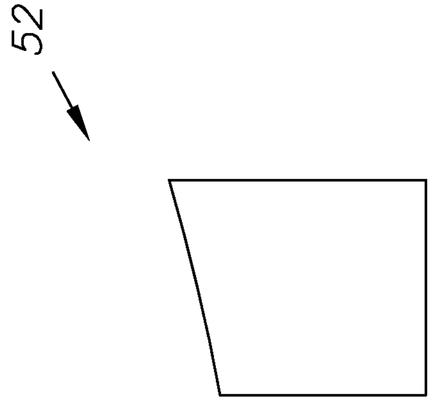
FIG. 8 is a right-side elevational view thereof.
Figure 7:
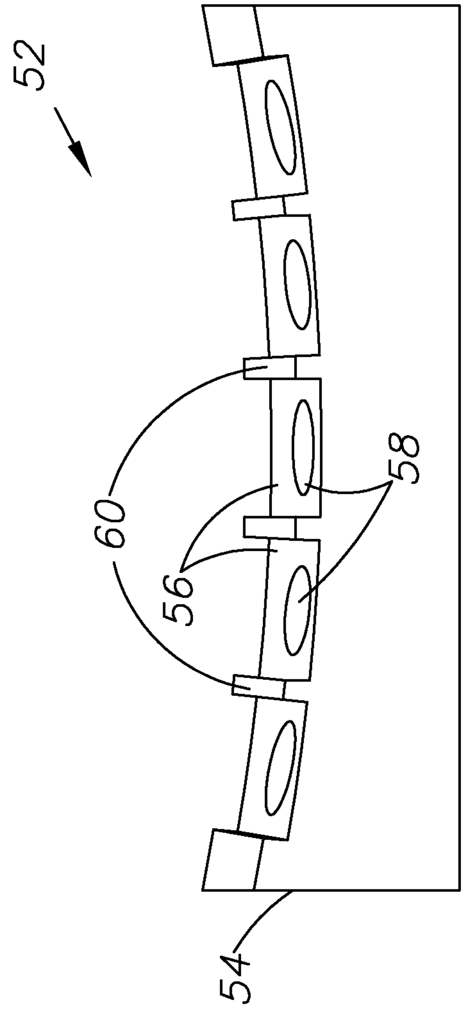
FIG. 7 is a front elevational view thereof.

FIGS. 6-8 show a slightly alternative embodiment laser ablation system 52 employing an alternative carrier 54 with the same purposes and goals of the previous embodiment laser ablation system 2. The mounting slots 56 for the nut plates 152, 162 are arranged in an alternative orientation from the previous embodiment, which may provide superior results in certain situations and with certain parts to be cleaned. Similar mounting holes 58 are included. As shown, these mounting slots 56 contain barriers 60 and are at a same relative height compared with the staggered height of the mounting slots 6 shown in the embodiment of FIGS. 1-5.

While traditional methods of laser ablation of nut plates and similar objects may reduce shadowing by manipulation of the objects during cleaning; the present invention reduces the level of shadowing to zero or near-zero with minimal to no manipulation required.

IV. Third Alternative Embodiment Laser Ablation System 102

FIG. 9 shows a diagrammatic view of a third laser ablation system 102 embodiment which explains how the optic 120 and f-theta lens 114 from the laser source 112 functionally strikes the various surfaces and mounting spaces 106 of the carrier 104, and thereby the exposed outer surface of a respective nut plate 152, 162, with laser beams 116. The mounting surface angle 11 is dependent upon the laser angle 111 of the scanned pattern and the relative position of the carrier 104. The number of parts that can be carried and cleaned using this system can vary, depending on the size of the part and the length of its axial protrusion. Other relevant dimensions may include the focal distance 118 to the lens 114.

Figure 11:
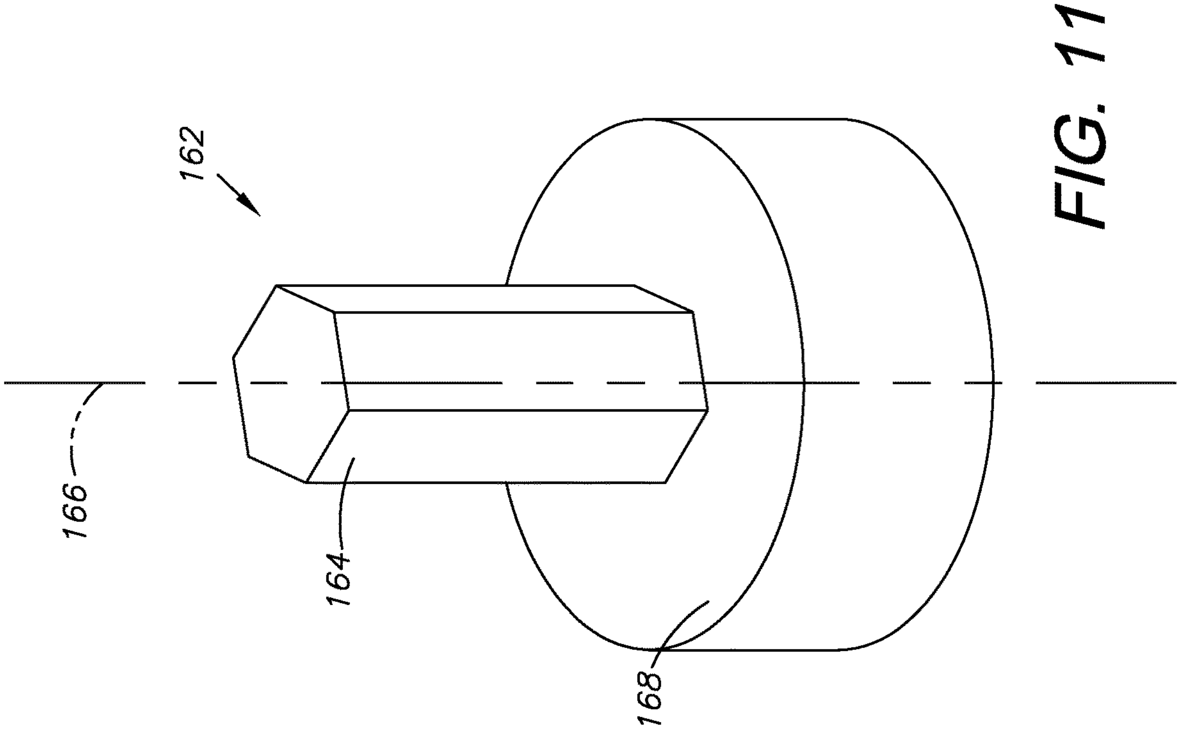
FIG. 11 is a three-dimensional isometric view of an alternative embodiment nut plate element.
Figure 12:
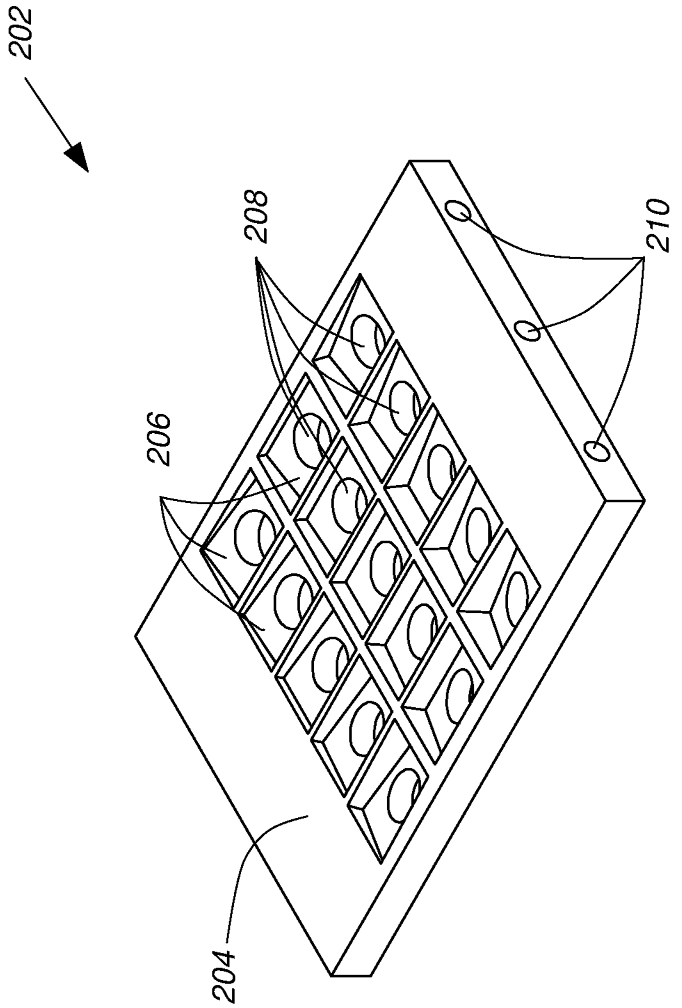
FIG. 12 is a three-dimensional isometric view of another alternative embodiment of the present invention.
Figure 13:
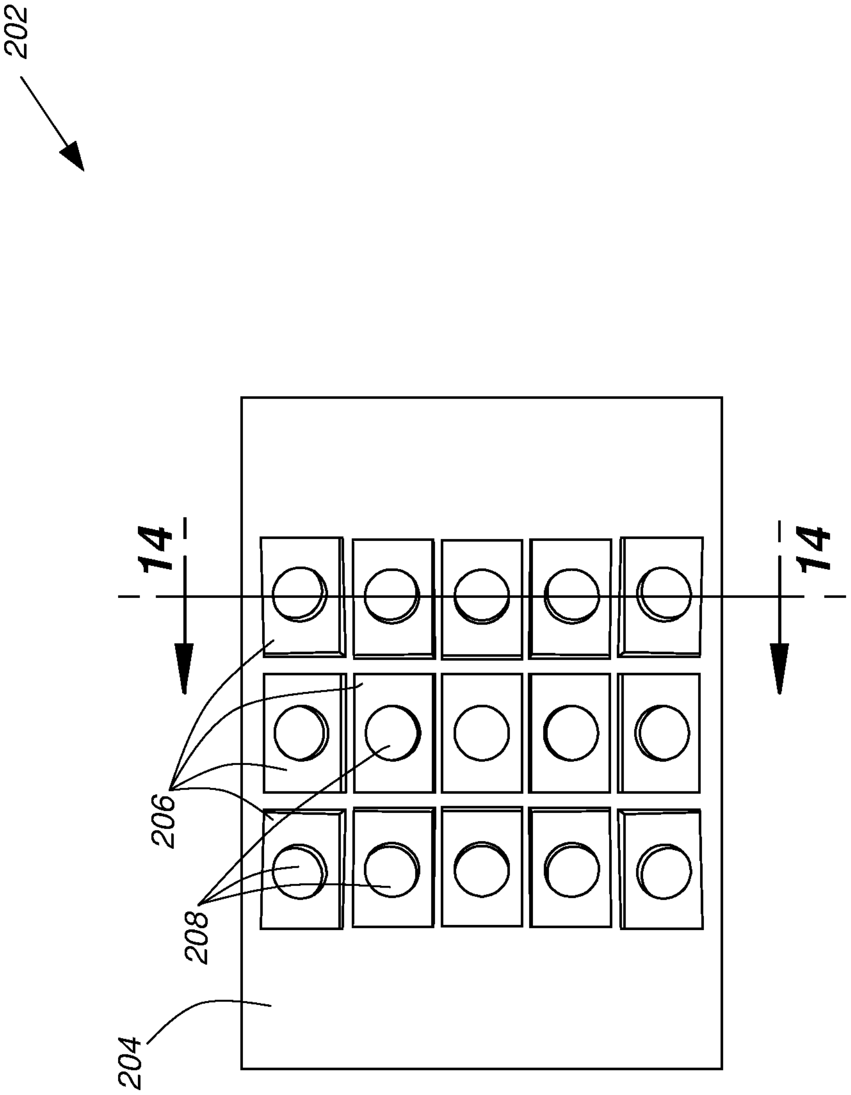
FIG. 13 is a top plan view thereof.
Figure 14:
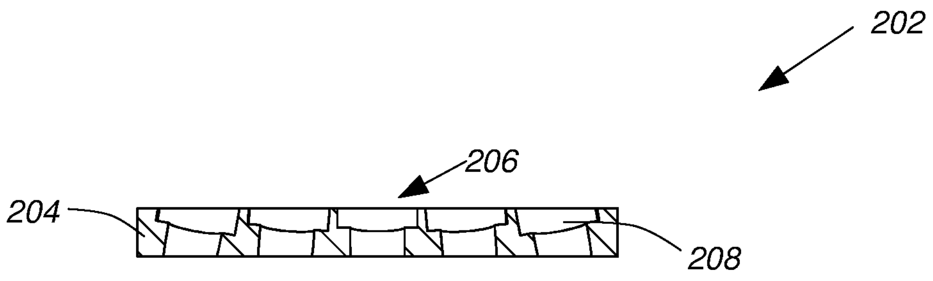
FIG. 14 is a side sectional view taken about the line of FIG. 13.
Figure 15:
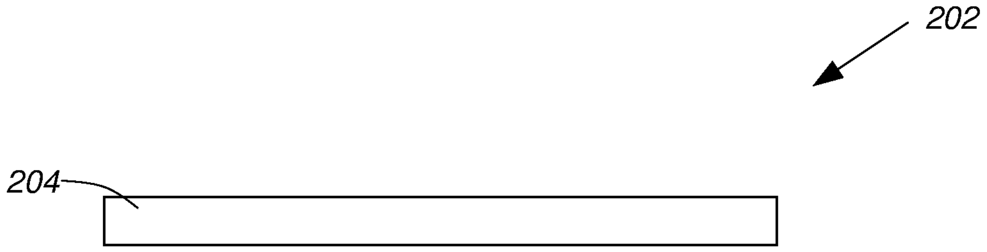
FIG. 15 is a front elevational view thereof.
Figure 16:
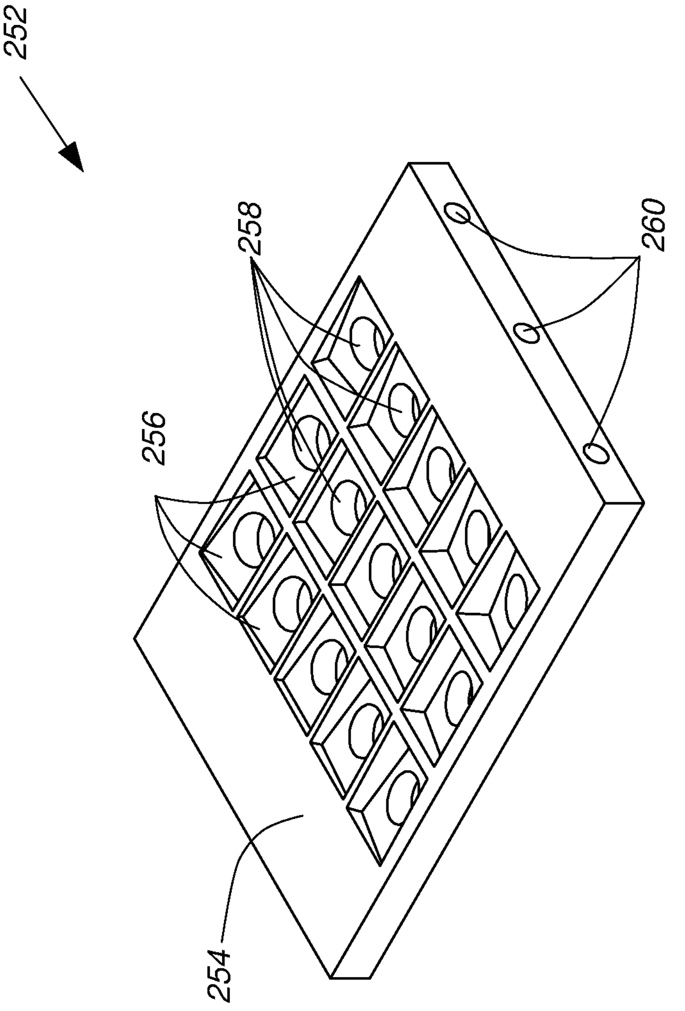
FIG. 16 is a three-dimensional isometric view of yet another alternative embodiment thereof.
Figure 17:
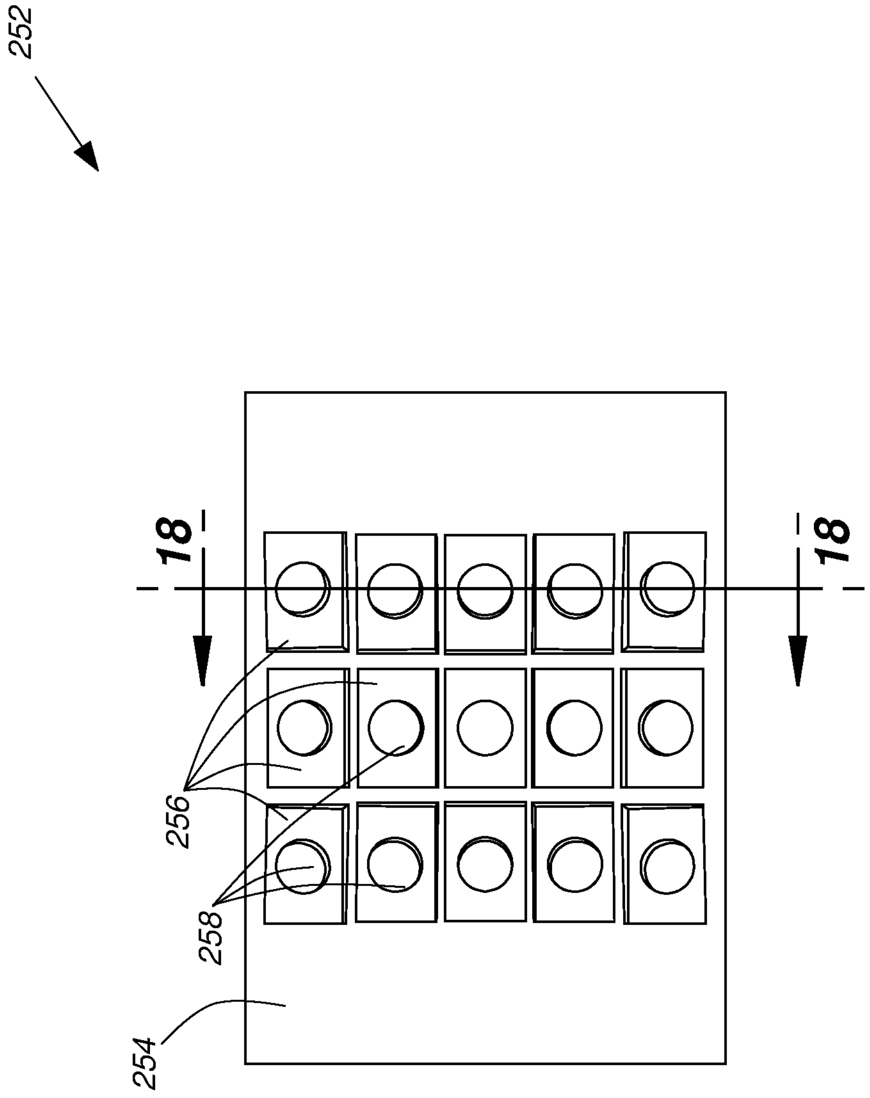
FIG. 17 is a top plan view thereof.
Figure 18:
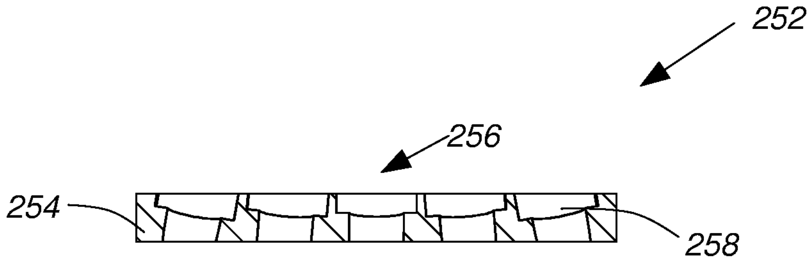
FIG. 18 is a side sectional view taken about the line of FIG. 17.
Figure 19:
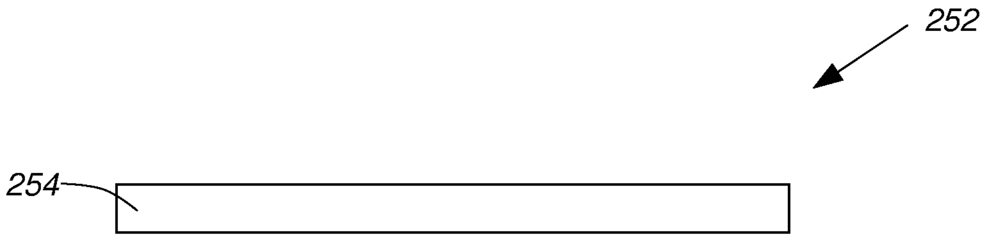
FIG. 19 is a front elevational view thereof.

FIGS. 11 and 12 show two different nut plates 152, 162, respectively, which can be carried using a carrier 4, 54, 104 of the present invention, or any suitable variation thereof. Each displays an axial protrusion 154, 164 along a perpendicular axis 156, 166 to the respective nut plate 152, 162. An elastic installation fixture may be part of the protrusion. The flange surface 158, 168 to be cleaned using the present invention is identified.

V. Fourth Alternative Embodiment Laser Ablation System 202

FIGS. 12-15 show another alternative embodiment laser ablation system 202 which employs a carrier 204 which is a tray with multiple layers of mounting spaces 206 with associated mounting holes 208.

Mounting point receivers 210 allow the carrier 204 to be mounted into position, potentially against additional carriers or a structural element.

VI. Fifth Alternative Embodiment Laser Ablation System 252

Similarly, FIGS. 16-19 show another alternative embodiment laser ablation system 202 with a similar carrier 254 in the form of a tray with multiple mounting spaces 256 with associated mounting holes 258.

Again, mounting point receivers 260 allow the carrier 254 to be mounted into position, potentially against additional carriers or a structural element.

Figure 20:
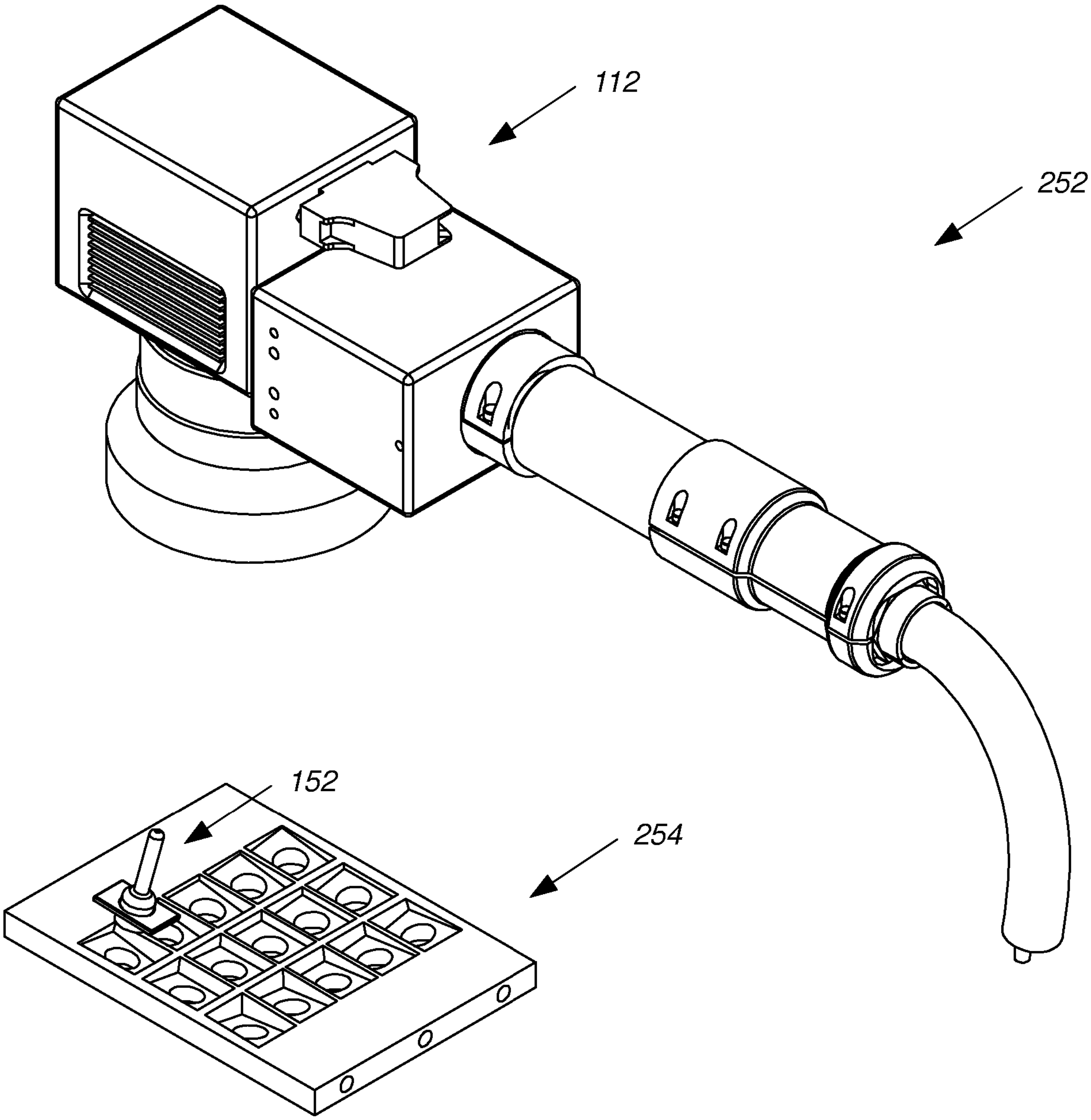
FIG. 20 is a three-dimensional isometric view thereof shown in a typical environment of a laser source and a nut plate.

FIG. 20 shows a laser source 112 in relation to this carrier 254, though it could similarly function with any of the previous carriers 4, 54, 104, 204, 254. A nut plate 152 is being mounted into the carrier 254 prior to the laser source 112 being operated to clean the nut plate surface.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A laser cleaning system comprising:

a laser source configured to produce a beam;

a galvo-scanning optic;

a carrier comprising a plurality of mounting surfaces each configured to receive one of a plurality of components each comprising axial protrusions;

wherein each respective one of said plurality of mounting surfaces is oriented relative to a base plane of said carrier such that a target cleaning surface of the component is positioned substantially normal to an incident angle with said optic's laser induced angle at its scan location;

wherein said orientation aligns the axial protrusion of each component with the axis of said beam of laser source, thereby preventing shadowing of said target cleaning surface; and wherein each of said plurality of components is cleaned by said beam of said laser source generated by said laser source through said optic wherein each respective one of said plurality of mounting surfaces is oriented at a distinguishable angle from each respective adjacent one of said plurality of mounting surfaces such that said target surface of each of said mounted component is substantially normal to said beam axis at its respective scan location.

2. The laser cleaning system of claim 1, further comprising:

wherein respective heights of each respective one of said plurality of mounting surfaces relative to a base edge of said carrier defines a concave geometry having shifted orientations such that each respective target cleaning surface is maintained within the focal depth of said optic while remaining substantially normal to said incident angle of said laser source.

3. A carrier adapted for use within a laser cleaning system, the carrier comprising:

a plurality of mounting surfaces each configured to receive one of a plurality of components each comprising axial protrusions;

each respective one of said plurality of mounting surfaces is oriented such that a target surface of a component mounted upon said respective one of said plurality of mounting surfaces is normal to a local incident angle of a laser beam produced by a laser source at its respective orientation; and each of said plurality of components is cleaned via a single pass across each respective said target surface by said laser source through said optic wherein each respective one of said plurality of mounting surfaces is oriented at a distinguishable angle from each respective adjacent one of said plurality of mounting surfaces such that said target surface of each of said mounted component is substantially normal to said laser beam at a respective scan location.

4. The carrier of claim 3, further comprising: wherein the local incident angle of each respective one of said plurality of mounting surfaces is at an angle different from the local incident angle of any adjacent one of said plurality of mounting surfaces.

5. The carrier of claim 3, wherein said plurality of mounting surfaces comprise at least two rows and at least two columns of mounting surfaces.

6. The carrier of claim 3, further comprising:

wherein said target surface comprises a nut plate;

wherein a center height of each respective one of said plurality of mounting surfaces relative to a base edge of said carrier may vary depending on a thickness of said nut plate; and wherein all said surfaces of respective nut plate surface shall be within the focal range or depth of field of the laser system's optic.

7. A method of cleaning an element with a laser, the method comprising the steps:

providing a laser source;

providing a galvo-scanning optic;

providing a carrier comprising a plurality of mounting surfaces each configured to receive one of a plurality of components each comprising at least one respective axial protrusion;

wherein each respective one of said plurality of mounting surfaces is oriented relative to a base plane of said carrier such that a target cleaning surface of the component is positioned substantially normal to an incident angle with said optic's laser induced angle; and cleaning each of said plurality of components by said laser source laser generated by said laser source through said optic wherein each respective one of said plurality of mounting surfaces is oriented at a distinguishable angle from each respective adjacent one of said plurality of mounting surfaces such that said target cleaning surface of each of said mounted component is substantially normal to said laser at a respective scan location.

* * * * *